3,035,978
FERROCENE HEMATINIC COMPOSITIONS
AND THERAPY
William Glynne Moss Jones, Thomas Leigh, and Juan
Luis Madinaveitia, all of Macclesfield, England, assignors to Imperial Chemical Industries Limited, London, England, a corporation of Great Britain
No Drawing. Filed July 28, 1958, Ser. No. 751,176
Claims priority, application Great Britain Aug. 12, 1957
10 Claims. (Cl. 167—68)

This invention relates to now compositions of matter and more particularly it relates to new pharmaceutical compositions containing ferrocene derivatives which are useful as haematinics for the treatment of iron deficiency anaemia in man and animals.

Thus according to the invention we provide pharmaceutical compositions wherein the active ingredient is at least one ferrocene derivative of the formula:

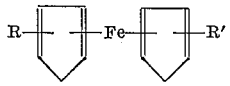

wherein R and R', which may be the same or different, each stand for hydrogen or for one or more hydrocarbon radicals or for one or more acyl radicals of the formula —CO.R" wherein R" stands for a hydrocarbon radical and wherein Fe stands for an atom of iron.

As suitable hydrocarbon radicals (R and R') there may be mentioned for example straight or branched chain alkyl radicals, cycloalkyl radicals, cycloalkenyl radicals, aryl radicals and aralkyl radicals.

Since dicyclopentadienyl iron is known to the art as ferrocene, the active ingredients of the present compositions can be regarded as mono-, di-, tri- and poly-acyl-ferrocenes and mono-, di-, tri- and poly-alkylferrocenes and ferrocenes containing one or more alkyl and acyl substituents. The essential feature of the structure of ferrocene is the symmetrical binding of the central metal atom to all five carbon atoms of each ring and the free rotation of the two rings relative to each other. Thus when each ring is substituted by a single substituent, there is only one possible structure for such disubstituted compounds and they are known as 1:1'-disubstituted compounds. When only one ring is substituted by two substituents, there are two possible structures for such disubstituted compounds and they are known as 1:2- or 1:3-disubstituted compounds. On the basis of the known art where the stability and properties of ferrocene are explained by the pentagonal antiprism configuration, the active ingredients of the present compositions can be regarded as having the formula:

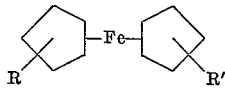

wherein R and R' have the meaning stated above.

Suitable derivatives of the above stated formula may be ferrocene, mono-ethylferrocene, mono-phenylferrocene, mono-benzylferrocene, 1:1'-di-n-butylferrocene, 1:1'-di-isobutylferrocene, mono-m-chlorophenylferrocene, mono-neopentylferrocene, 1:1' - di - neopentylferrocene, mono - cyclopentylferrocene, mono - cyclopentenylferrocene, mono - hexahydrobenzylferrocene, 1:1'-di-hexahydrobenzylferrocene, 1:1'-di-tertiary - butylferrocene, di-tertiary-butylferrocene, M.P. 61° C., tri-tertiary-butylferrocene, M.P. 91° C., tetra-tertiary-butylferrocene, M.P. 198° C., tetratertiary-amylferrocene, M.P. 110° C., 1:1'-di-tertiary-amylferrocene, 1:1' - di - (1:1:3:3-tetramethylbutyl)ferrocene, mono-pivalylferrocene, 1:1'di-pivalylferrocene, mono-hexahydrobenzoylferrocene, 1:1'-di-hexahydrobenzoylferrocene, mono-laurylferrocene and 1-pivalyl-1'-neopentylferrocene, M.P. 54° C.

Particularly valuable compounds for use as active ingredients in the compositions of the invention are 1:1'-di-neopentylferrocene, 1:1' - di - tertiary-butylferrocene, monobenzylferrocene and monophyenylferrocene.

The compounds used as active ingredients may be prepared for example by reacting ferrocene either with an acid halide or an acid anhydride to give acylferrocene derivatives which may then be reduced preferably by the method known to the art as the Clemmensen process or catalytically in the presence of hydrogen and a hydrogenation catalyst. The tertiary alkylferrocene derivatives may be obtained by alkylation of ferrocene with for example tertiary-butyl chloride or tertiary-amyl chloride in the presence of a catalyst for example aluminum chloride. The tertiary alkylferrocene derivatives may also be obtained by interaction of the corresponding tertiary-alkyl cyclopentadienyl alkali metal derivatives for example the sodium derivatives and an anhydrous iron halide for example ferrous chloride. The said sodium derivatives may be prepared according to the known art from the corresponding tertiary-alkyl cyclopentadiene derivatives by reaction with finely divided sodium in the presence of toluene and the tertiary-alkyl cyclopentadiene derivatives themselves may be prepared by alkylation of the corresponding cyclopentadienyl magnesium halide with a tertiary-alkyl halide for example tertiary-butylchloride.

The said new pharmaceutical compositions may be in a form suitable for oral use, for parenteral use, for external application or for addition to animal foodstuffs.

The compositions suitable for oral use may be in the form of tablets, optionally coated, pastes, aqueous suspensions, emulsions, oily solutions or suspensions or capsules.

Suitable tablets for oral use may be formulated by admixture of the active ingredient with known pharmaceutical excipients for example inert diluents for example calcium carbonate, disintegrating agents for example maize starch and alginic acid, and lubricating agents for example magnesium stearate. Such tablets may optionally be coated by known techniques in order to delay disintegration in the stomach and thus to provide a sustained action over an extended period. The said tablet compositions may be formulated so that for every 100 parts by weight of the said composition there are present between about 10 parts by weight and 90 parts by weight of the active ingredient and preferably between 75 and 85 parts by weight of the active ingredient.

The oral compositions, as indicated above, may also be in the form of pastes, aqueous suspensions or emulsions and oily solutions or suspensions and such preparations generally contain a sweetening agent for example glycerol, dextrose or sucrose and a flavouring agent for example vanillin or orange extract in order to provide a palatable product. The pastes and aqueous suspensions may also contain suitable suspending or thickening agents for example sodium carboxymethylcellulose, wetting agents for example condensation products of fatty alcohols for example cetyl alcohol with ethylene oxide, and suitable preservatives for example methyl and/or propyl p-hydroxybenzoate. Such pastes and suspensions generally contain between 5% and 85% by weight and preferably between 35% and 65% by weight of the active ingredient. Emulsions contain the active ingredient dissolved in a suitable fat of vegetable or animal origin for example arachis oil, cod liver oil and contain sweetening agents and flavouring agents which may with advantage be essential oils. They are prepared by the conventional methods by the use of emulsifying agents and dispersing agents for example soya bean, lecithin, polyoxyethylene sorbitan monooleate, gum acacia, gum tragacanth, casein and also contain preservatives for example methyl and propyl p-hydroxybenzoate and anti-oxidants for example propyl gallate. Emulsions preferably contain between 5% and 30% by weight and more particularly between 5% and 15% by weight of the stated active ingredient.

Oily solutions for oral use likewise contain the active ingredient in solution in a suitable fat of vegetable or animal origin and may optionally contain flavouring agents to mask the taste and improve oral acceptability. Such oily solutions may advantageously be filled into soft gelatin capsules. The capsules may contain between 5% and 95% by weight and preferably between 60% and 95% by weight of the desired active ingredient. The oily solutions may also contain sweetening agents for example icing sugar in which case the oil phase may in addition contain a suspending agent for example beeswax to maintain the redispersion properties of the suspension.

Oral compositions in the form of hard gelatin capsules may contain the active ingredient in admixture with inert diluents for example lactose and sorbitol and may optionally contain additional substances which correct the state of nutritional deficiency which sometimes accompanies anaemic conditions for example sodium ascorbate, aneurine, hydrochloride, riboflavine, nicotinamide, pyridoxine and vitamin B 12.

Compositions suitable for parenteral use may be in the form of sterile injectable aqueous suspensions, oily solutions or emulsions. The said aqueous suspensions contain a suspending or thickening agent for example sodium carboxymethylcellulose and a wetting or dispersing agent for example a phenol-polyethylene oxide condensate for example the condensation product of octylcresol with about 8–10 molecular proportions of ethylene oxide. The said injectable oily solutions may be prepared from a non-toxic injectable fat or oil for example arachis oil or ethyl oleate and they may additionally contain gelling agents for example aluminium stearate to delay absorption within the body. Injectable emulsions contain the active ingredient in solution in a suitable oil for example fats of vegetable or animal origin for example arachis oil, coconut oil, cod liver oil and fatty acid esters for example ethyl oleate, dibutyl succinate. They are prepared by conventional methods by the use of parenterally acceptable emulsifying and dispersing agents as described above and contain in addition antioxidants for example nordihydroguariaretic acid. These aqueous, oily and emulsified injectable preparations contain preservatives such as methyl and propyl p-hydroxybenzoate and chlorobutanol.

The pharmaceutical compositions may also be used for external application for example for use in body cavities in the form of suppositories. Such preparations may contain inert diluents or carriers such as non-toxic waxy or fatty materials for example polyethyleneglycols for example polyethyleneglycols 400 and 1000 and suitable fatty acid derivatives thereof for example polyethyleneglycol 400 monostearate. The said suppositories preferably contain between 20% and 50% by weight of the active ingredient. Suppositories may also be prepared using the conventional suppository bases for example oil of theobroma, polyethylene glycols, stearic acid and oleic acid.

The preparations for animal administration may be in the form of a premix suitable for dilution by addition to animal foodstuffs. Such a premix may contain the active ingredient in admixture with a non-toxic inert diluent or carrier for example soya bean meal or calcium carbonate. Alternatively the premix may be in the form of an emulsion which may be added to a suitable liquid foodstuff for example milk products used for the feeding of young animals.

As stated above the new compositions of this invention are valuable for the treatment of iron deficiency anaemia in man and animals.

The invention is illustrated but not limited by the following examples in which the parts are by weight:

*Example 1*

500 parts of 1:1′-di-neopentylferrocene, 100 parts of maize starch and 50 parts of alginic acid are mixed and the mixture is compressed into granules. The granules are sieved through an 8-mesh sieve and are then compressed into tablets. The tablets so obtained are suitable for oral use for therapeutic purposes.

The 1:1′-di-neopentylferrocene used as starting material may be obtained according to the following process:

To a solution of 3.6 parts of ferrocene in 25 parts of ethylene dichloride are added 5.4 parts pivalyl chloride. The solution is stirred and cooled to 0° C. and 6.3 parts of anhydrous aluminium chloride are added during one hour. The reaction mixture is stirred at 0° C. for a further one hour and it is then poured on to 200 parts of crushed ice. The lower ethylene dichloride layer is separated and is washed first with dilute aqueous hydrochloric acid and then with dilute aqueous sodium hydroxide and finally with water. The ethylene dichloride is distilled at a pressure of 20 mm. of mercury. The residue consists of a mixture of 1:1′-dipivalylferrocene and monopivalylferrocene. By a process of fractional crystallisation from petroleum ether there are obtained 1:1′-dipivalylferrocene, M.P. 126° C. and monopivalylferrocene, M.P. 92° C.

20 parts of granulated zinc are added to a solution of 2 parts of mercuric chloride in 20 parts of normal aqueous hydrochloric acid. After ten minutes the aqueous solution is decanted and the zinc amalgam is added to a mixture of 40 parts of ethyl alcohol, 60 parts of concentrated aqueous hydrochloric acid and 6 parts of 1:1′-di-pivalylferrocene (obtained as described above). The mixture is stirred and heated under reflux for 6 hours. The precipitated oil is decanted whilst hot from unused zinc and is then allowed to crystallise. It is washed with water and recrystallised from ethyl alcohol to give 1:1′-di-neopentylferrocene, M.P. 68° C.

*Example 2*

The tablets obtained as described in Example 1 are coated with a solution prepared from 1 part of cetyl alcohol, 1 part of stearic acid and 2 parts of shellac in 6 parts of ethanol. After coating, the tablets are dried and the coating treatment is repeated several times until a coating of the desired thickness is obtained. There are thus obtained coated tablets suitable for oral use for therapeutic purposes.

*Example 3*

500 parts of sodium carboxymethylcellulose are pasted with 1500 parts of glycerine and after standing for one hour the paste is added to a solution of 2.6 parts of methyl p-hydroxybenzoate and 1.4 parts of propyl p-hydroxybenzoate in 8000 parts of water. The mixture is stirred at 60° C. for one hour and then cooled in ice-water. 250 parts of the gel thus obtained are mixed with 100 parts of 1:1′-di-neopentylferrocene which have been wetted out with a solution of 0.2 part of a cetyl alcohol-ethylene oxide condensate in 20 parts of water. There is thus obtained a paste suitable for oral administration for therapeutic purposes.

*Example 4*

1.8 parts of methyl p-hydroxybenzoate, 0.2 part of propyl p-hydroxybenzoate, 4 parts of an octyl cresol-polyethyleneoxide condensate and 1 part of sodium carboxymethylcellulose are dissolved in 1000 parts of water and the solution is sterilised by heating in an autoclave at 10–15 lbs. pressure for 30 minutes. 680 parts of sterile ferrocene are added to the cooled solution and the mixture is then ball milled for 5 hours. There is thus obtained a sterile aqueous suspension suitable for parenteral administration for therapeutic purposes.

*Example 5*

A mixture of 5 parts of 1:1′-di-neopentylferrocene, 6.5 parts of polyethyleneglycol 1000, 1 part of polyethyleneglycol 400 and 1 part of polyethyleneglycol 400 monostearate is heated to 60–70° C. and is then vigorously stirred until it cools to 25° C. The mass is rolled out to an appropriate size and is then divided into the required number of equal parts. There are thus obtained suppositories suitable for anal use for therapeutic purposes.

Example 6

30 parts of sterile mono-dodecylferrocene are dissolved in 120 parts of sterile peanut oil containing 0.6 part of chlorobutanol. There is thus obtained an oily solution suitable for intramuscular injection for therapeutic purposes.

Example 7

0.125 part of methyl p-hydroxybenzoate and 0.125 part of propyl p-hydroxybenzoate are dissolved in 600 parts of de-ionised water at 95–100° C. The solution is cooled to 60° C. and 0.78 part of sodium carboxymethylcellulose is added with stirring. Stirring is continued until solution is complete after which the solution is added to a stirred mixture of 200 parts of 1:1'-di-neopentylferrocene, 200 parts of icing sugar and 0.35 part of vanillin which has previously been pasted with a solution of 1.3 parts of a cetyl alcohol polyethylene oxide condensate in 50 parts of water. Stirring is continued until the mixture is homogeneous. There is thus obtained an aqueous suspension suitable for oral use for therapeutic purposes.

Example 8

25 parts of mono-dodecylferrocene and 0.016 part of nordihydroguariaretic acid are dissolved in 100 parts of arachis oil. The solution is then added to a mixture of 31 parts of gum acacia and 1.75 parts of gum tragacanth. The resultant mixture is triturated with a solution of 0.15 part of methyl p-hydroxybenzoate, 0.02 part of propyl p-hydroxybenzoate and 40 parts of sucrose in 100 parts of water. After the further addition of the required amount of orange extract for adequate flavouring the mixture is homogenised. There is thus obtained a flavoured emulsion suitable for oral use for therapeutic purposes.

Example 9

A solution of 5 parts of a cetyl alcohol-polyethyleneoxide condensate in 15 parts of water is sprayed on to 1000 parts of 1:1'-di-neopentylferrocene contained in a ribbon type blender. The coated di-neopenylferrocene is then placed in a cone blender with 2000 parts of soya bean meal and the mixture is blended until it is uniform. There is thus obtained a premix for blending with other constitutents of an animal feed to be used for therapeutic purposes.

Example 10

50 parts of 1:1'-di-neopentylferrocene are mixed with 50 parts of lactose. The mixture is filled into hard gelatin capsules which are suitable for oral use for therapeutic purposes.

Example 11

25 parts of mono-dodecylferrocene are dissolved in 75 parts of arachis oil. The solution is filled into gelatin capsules which are suitable for oral use for therapeutic purposes.

Example 12

A mixture of 10 parts of tri-tertiary-butylferrocene, 2 parts of maize starch and 1 part of alginic acid is compressed into slugs. The slugs are then broken down into granules and passed through a 16-mesh screen. The granules are then re-compressed into tablets which are suitable for oral administration for therapeutic purposes.

Example 13

A mixture of 100 parts of tri-tertiary-butylferrocene, 50 parts of calcium phosphate and 30 parts of maize starch is granulated with a sufficient quantity of 10% maize starch paste. The granules are dried at 50° C. and. are then mixed with 2 parts of magnesium stearate. The resulting mixture is compressed into tablets which are suitable for oral administration for therapeutic purposes.

Example 14

A mixture of 15 parts of mono-phenylferrocene, 3 parts of maize starch and 1 part of alginic acid is compressed into slugs. The slugs are then broken down into granules and passed through a 16-mesh screen. The granules so obtained are then compressed into tablets which are suitable for oral administration for therapeutic purposes.

Example 15

A mixture of 100 parts of mono-m-chloro-phenylferrocene, 60 parts of calcium phosphate and 25 parts of maize starch is granulated with a sufficient quantity of 10% maize starch paste. The granules are dried at 50° C. and after sieving through a 16-mesh sieve are then mixed with 3 parts of magnesium stearate. The resulting mixture is compressed into tablets which are suitable for oral administration for therapeutic purposes.

Example 16

A mixture of 20 parts of 1-pivalyl-1'-neopentylferrocene, M.P. 54° C., 3 parts of maize starch and 1 part of alginic acid is compressed into slugs. The slugs are broken down into granules and passed through a 16-mesh screen. The granules are then re-compressed into tablets which are suitable for oral administration for therapeutic purposes.

Example 17

24 parts of 1:1'-di-tertiary-butylferrocene are dissolved in 100 parts of ethyl oleate. The solution thus obtained is filled into ampoules and sterilised by heating at 150° C. for 1 hour. There is thus obtained a solution suitable for parenteral injection for therapeutic purposes.

The 1:1'-di-tertiary-butylferrocene used as starting material may be obtained by the following process:

A solution of 546 parts of ethyl bromide in 1800 parts of diethyl ether is added to a stirred suspension of 120 parts of magnesium turnings and 80 parts of diethyl ether during 2 hours. The mixture is stirred for a further one hour. 264 parts of cyclopentadiene are then added to the mixture over one hour and after stirring for a further 24 hours, 556 parts of tertiary-butyl chloride are added during 90 minutes. The reaction mixture is stirred for 24 hours and is then poured on to 5000 parts of crushed ice. The ethereal layer is separated and is washed with water and dried over anhydrous sodium sulphate. The ether is removed under reduced pressure and the residue is distilled. There is thus obtained tertiary-butyl cyclopentadiene, B.P. 45° C./28 mms.

92 parts of sodium are added gradually to 2000 parts of liquid ammonia containing 2 parts of ferric nitrate crystals and the mixture is stirred for one hour and then 530 parts of tertiary-butyl cyclopentadiene (obtained as described above) are added at —35° C. The mixture is stirred during 2 hours and then 1200 parts of tetrahydrofuran are added and the temperature of the mixture is allowed to rise to 25° C. whereby most of the ammonia is removed by evaporation. The residue is cooled to 5–10° C. and 254 parts of anhydrous ferrous chloride are added during one hour. The mixture is stirred during 20 hours at 20–25° C. and it is then filtered. The filtrate is diluted with water and the mixture is cooled in ice and then filtered. The solid residue is crystallised from ethyl alcohol and there is thus obtained 1:1'-di-tertiary-butylferrocene, M.P. 28° C. and B.P. 92° C./0.5 mm.

Example 18

100 parts of 1:1'-di-tertiary-butylferrocene are mixed with 100 parts of arachis oil. The solution so obtained is filled into soft gelatin capsules which are then suitable for oral use for therapeutic purposes.

Example 19

100 parts of 1:1'-di-tertiary-butylferrocene are mixed with 100 parts of cod liver oil. The solution so obtained is filled into soft gelatin capsules which are then suitable for oral use for therapeutic purposes.

Example 20

100 parts of 1:1'-di-tertiarybutylferrocene are mixed with 100 parts of coconut oil. By the incorporation of essential oils and other flavouring agents there is obtained an oily solution suitable for oral use for therapeutic purposes.

Example 21

0.5 part of propyl gallate is dissolved in a mixture of 200 parts of coconut oil, 380 parts of arachis oil, 200 parts of 1:1'-di-tertiary-butylferrocene and 20 parts of beeswax maintained at a temperature of 40° C. The oily solution so obtained is added gradually to a stirred mixture of 600 parts of finely ground icing sugar and 10 parts of sodium saccharin. After the incorporation of a suitable flavouring agent there is obtained an oily suspension suitable for oral use for therapeutic purposes.

Example 22

A solution is prepared by dissolving 1.5 parts of methyl p-hydroxybenzoate, 0.2 part of propyl p-hydroxybenzoate and 50 parts of refined soya bean lecithin in 1000 parts of distilled water. The aqueous vehicle so obtained is sterilised by heating in an autoclave at 10–15 lbs. pressure. After cooling, the aqueous vehicle is stirred in a conventional blender during the portion-wise addition of a solution of 330 parts of 1:1'-di-tertiary-butylferrocene, 15 parts of a polyoxyethylene condensate of sorbitan mono-oleate, 0.1 part of nordihydroguariaretic acid and 330 parts of ethyl oleate previously sterilised by heating at 150° C. for 1 hour. The crude emulsion so obtained is homogenised and there is thus obtained an emulsion suitable for parenteral injection for therapeutic purposes.

Example 23

The process described in Example 22 is repeated except that the 330 parts of ethyl oleate are replaced by 330 parts of arachis oil and the sterile conditions of operation are omitted. By including suitable flavouring and sweetening agents there is obtained a emulsion suitable for oral administration for therapeutic purposes.

Example 24

1000 parts of 1:1'-di-neopentylferrocene, 200 parts of sodium ascorbate, 6 parts of aneurine hydrochloride, 10 parts of riboflavine, 30 parts of nicotinamide and 2 parts of pyridoxine hydrochloride are blended in a suitable mixer. The mixture thus obtained is filled into hard gelatin capsules which are then suitable for oral administration for therapeutic purposes.

Example 25

100 parts of 1:1'-di-neopentylferrocene are dissolved in 500 parts of ethyl oleate. The solution so obtained is filled itno ampoules and sterilised by heating at 150° C. for 1 hour. There is thus obtained an oily solution suitable for parenteral injection for therapeutic purposes.

Example 26

A suspension is prepared by triturating 50 parts of refined soya bean lecithin with a solution of 1.5 parts of methyl p-hydroxybenzoate and 0.2 of propyl p-hydroxybenzoate in 1000 parts of water, the solution being added portion-wise to the lecithin. The aqueous vehicle so obtained is sterilised by heating in an autoclave at 10–15 lbs. pressure. After cooling the aqueous vehicle is added portion-wise to a solution of 100 parts of 1:1'-di-neopentylferrocene, 10 parts of polyoxyethylene sorbitan tristearate and 0.1 part of nordihydrogauriaretic acid in 500 parts of ethyl oleate previously sterilised by heating at 150° C. for 1 hour, and stirred in a conventional blender. The crude emulsion so obtained is homogenised by passage through a homogeniser and there is thus obtained an emulsion suitable for parenteral injection for therapeutic purposes.

Example 27

300 parts of sterile micro-pulverised 1:1'-di-neopentylferrocene are pasted with a solution of 1 part of an octylcresol polyethyleneoxide condensate dissolved in 80 parts of ethyl alcohol which has been filtered through a sterile filter. The paste is stirred in a conventional mixer until evaporation of the alcohol has taken place. The dry powder is then added gradually to a stirred mixture of 3 parts of sterile micro-pulverised sodium carboxymethylcellulose, 0.9 part of sterile methyl p-hydroxybenzoate and 0.1 part of sterile propyl p-hydroxybenzoate and the resulting mixture is homogenised by further grinding in a micro-pulveriser. There is thus obtained a sterile water-dispersible powder suitable for conversion to an aqueous suspension for parenteral injection for therapeutic purposes.

Example 28

A mixture of 120 parts of tetra-tertiary-butylferrocene, 70 parts of calcium phosphate and 25 parts of maize starch is granulated with a sufficient quantity of 10% maize starch paste. The granules are dried at 50° C. and after sieving through a 16-mesh sieve are mixed with 3 parts of magnesium stearate. The resulting mixture is compressed into tablets which are suitable for oral administration for therapeutic purposes.

Example 29

A mixture of 25 parts of mono-benzylferrocene, 3.5 parts of maize starch and 1 part of alginic acid is compressed into slugs. The slugs are broken down into granules and passed through a 16-mesh screen. The granules are then re-compressed into tablets which are suitable for oral administration for therapeutic purposes.

What we claim is:

1. A process for the treatment of iron deficiency anaemia in man and animal which comprises administering to said man and animal an effective amount of at least one ferrocene derivative of the formula:

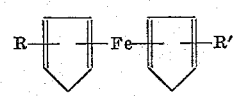

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals.

2. A process for the treatment of iron deficiency anaemia in man and animal which comprises administering thereto an effective amount of 1:1'-di-neopentylferrocene.

3. A pharmaceutical composition comprising as active ingredient at least one ferrocene derivative of the formula:

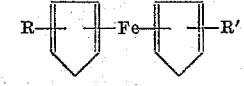

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals in admixture with a non-toxic, orally-acceptable diluent selected from the group consisting of vegetable oils and animal oils.

4. A pharmaceutical composition for oral administration comprising a gelatin capsule containing at least one ferrocene derivative of the formula:

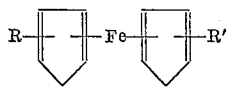

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals in admixture with a non-toxic, orally-acceptable carrier therefor.

5. The composition of claim 4 wherein said carrier is selected from the group consisting of animal and vegetable oils, sorbitol and lactose.

6. A composition suitable as a premix for addition to an animal foodstuff comprising at least one ferrocene derivative of the formula:

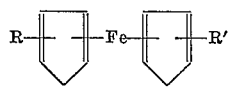

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals and a non-toxic, inert diluent selected from the group consisting of soya bean meal and calcium carbonate.

7. A composition comprising an animal foodstuff and at least one ferrocene derivative of the formula:

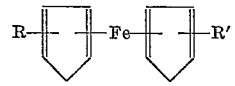

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals.

8. A pharmaceutical composition which comprises at least one ferrocene derivative of the formula:

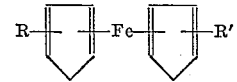

wherein R and R' are selected from the group consisting of hydrogen, alkyl, cycloalkyl, cycloalkyl-alkyl, cycloalkenyl, phenyl, halogenophenyl, phenylalkyl, alkyl carbonyl, cycloalkyl carbonyl, cycloalkenyl carbonyl, phenyl carbonyl, halogenophenyl carbonyl and phenylalkyl carbonyl radicals, in admixture with a non-toxic, pharmaceutically-acceptable carrier and a pharmaceutical excipient which is different from said carrier and is selected from the group consisting of antioxidants and sweetening, flavoring, thickening, wetting, suspending, emulsifying, dispersing, preserving, gelling, disintegrating and lubricating agents, said composition being in tablet form suitable for oral administration, and comprising between 10% by weight and 90% by weight of active ingredient.

9. A suppository comprising a suppository base and, as the active ingredient, at least one ferrocene derivative of the formula:

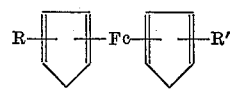

wherein R and R' are selected from the group consisting of hydrogen, alkyl, cycloalkyl, cycloalkyl-alkyl, cycloalkenyl, phenyl, halogenophenyl, phenylalkyl, alkylcarbonyl, cycloalkylcarbonyl, cycloalkenylcarbonyl, phenylcarbonyl, halogenophenylcarbonyl and phenylalkylcarbonyl radicals.

10. The suppository of claim 9 wherein said base comprises polyethylene glycol.

References Cited in the file of this patent

UNITED STATES PATENTS

| | | |
|---|---|---|
| 114,264 | Clapp | May 2, 1871 |
| 641,017 | Jolles | Jan. 9, 1900 |
| 1,824,018 | Horn | Sept. 22, 1931 |
| 2,680,756 | Pauson | June 8, 1954 |
| 2,763,613 | Scott | Sept. 18, 1956 |
| 2,816,060 | Carter | Dec. 10, 1957 |
| 2,831,880 | Benkeser | Apr. 22, 1958 |
| 2,859,233 | Graham et al. | Nov. 4, 1958 |

OTHER REFERENCES

Nature, vol. 171, No. 4342, Jan. 17, 1953, pp. 121–2.

Jaffe: Journal of Chemical Physics, 21:1, pp. 156–7, January 1953.

Pauson: J.A.C.S., vol. 76, pp. 2187–91, Apr. 20, 1954.

Arimoto et al.: J.A.C.S., vol. 77, pp. 6295-7, Dec. 5, 1955.

Benkeser et al.: J.A.C.S., vol. 76, pp. 4025–4026, Aug. 5, 1954.